United States Patent Office 3,281,666
Patented Oct. 25, 1966

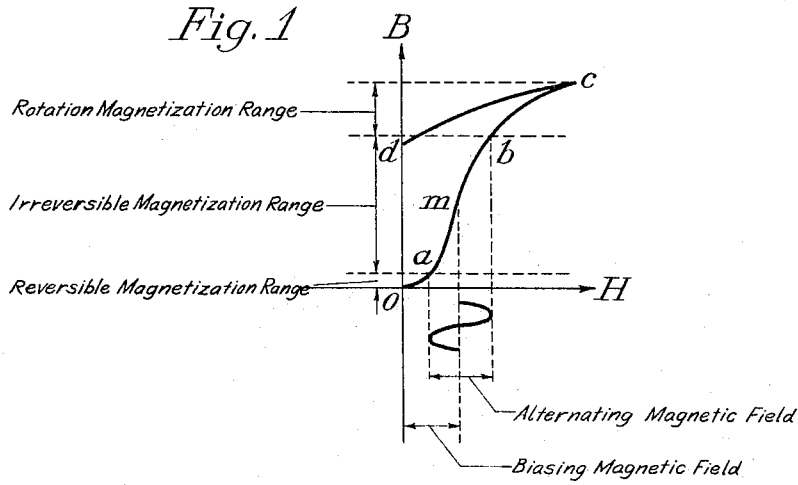
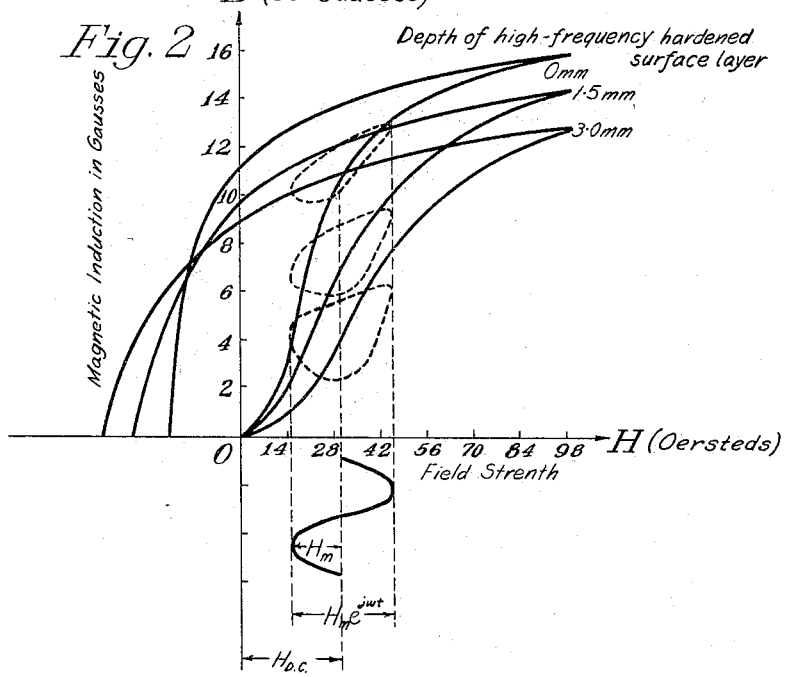

3,281,666
METHOD OF TESTING HARDENED STEEL ARTICLES UTILIZING THE IRREVERSIBLE PORTION OF THE MAGNETIZATION CURVE
Takayuki Makino, Okazaki, Japan, assignor to Toyota Motors Company, Limited, Toyoda, Japan, a corporation of Japan
Filed Oct. 23, 1961, Ser. No. 146,496
Claims priority, application Japan, Oct. 28, 1960, 35/42,960
6 Claims. (Cl. 324—34)

This invention relates generally to a system of testing hardened ferromagnetic steel articles and more particularly to a system of determining a depth or thickness of a hardened surface layer formed on a ferromagnetic steel article and the quality of the hardened articles without destroying the article.

It is well known that many ferromagnetic steel articles have their electric and magnetic properties closely connected with either the configuration of hardened surface layers formed on the same such as by high-frequency hardening or cementation hardening technique, or the quality of the hardened article such as hardness, composition of ingredients, heat treated state, etc. Also it is widely known that, by determining their electric and magnetic properties, such steel articles can have the depth or thickness of hardened surface layers on the articles or the quality of the same determined without destroying the articles.

There have been heretofore proposed various methods of electromagnetically checking hardened surface layers formed on ferromagnetic steel articles to determine the depth of thickness of the hardened layer, hardness, ingredients contained therein and the like by measuring their electric and magnetic properties such as specific resistance, coercive force, hysteresis loss, residual magnetic flux, initial permeability, etc. For example, a so-called "differential comparison" method is known in which a standard specimen is utilized and is compared with an article to be measured whereby the difference between initial permeabilities of the specimen and the article provides a measure of the depth or thickness of the hardened surface layer formed on the article. At present, various types of a practical apparatus used for these purposes are commercially available in the market. However, such methods all have various disadvantages. For example, they are subject to a great limitation as to their application because of the configuration, surface roughness and heat-treated state of a specimen to be tested and the like. Each of the conventional methods is applicable only to the particular configuration of the specimen. Alternatively, they are required to use measuring instruments of high sensitivity resulting in troublesome measurement. The "differential comparison" method above-mentioned is not only low in sensitivity and degree of accuracy but also is inconvenient in use with a standard specimen. For these reasons the conventional methods do not satisfactorily provide measurement methods suitable for use in factories whereby mass-produced steel articles should have determined the depth or thickness of the hardened surface layers formed on the same or the quality of the hardened articles in an easy, stable, rapid and universal manner.

A principal object of the invention is accordingly to provide an improved system of determining a depth or thickness of a hardened surface layer formed on a ferromagnetic steel article and/or the quality of the hardened ferromagnetic steel article without destroying the article and in which the aforesaid disadvantages are eliminated.

Another object of the invention is to provide an improved system of electromagnetically determining a depth or thickness of a hardened surface layer formed on a ferromagnetic steel article in an easy and stable manner.

A further object of the invention is to provide an improved ssytem of electromagnetically determining a depth or thickness of a hardened surface layer on different mass-produced steel articles and/or the quality of the hardened articles in an easy, stable and rapid manner regardless of their configuration and type.

Another object of the invention is to provide an improved system of determining a depth or thickness of a hardened surface layer formed on different ones of a mass-produced steel article and/or the quality of the hardened articles which does not destroy the article and which is especially suitable for use in factories.

Another object of the invention is to provide an improved system capable of directly reading a depth or thickness of a hardened surface layer formed on a steel article with a high degree of accuracy and without the necessity of using a standard specimen which otherwise is used in the so-called "differential comparison" method as above set forth.

According to the invention, the apparatus for testing a hardened ferromagnetic steel article without destroying it comprises a source of alternating current having a fixed frequency, field producing means and capacitor means connected in series circuit relationship to form a series resonant circuit tuned at the frequency of the source, and a source of direct current. The field producing means are energized by both sources to establish a periodically varying magnetic field extending over substantially the entire range of an irreversible magnetization region of the initial magnetization curve for an unhardened ferromagnetic steel article corresponding in configuration and type to the hardened articles to be tested. Then the hardened ferromagnetic steel article to be tested is disposed within the periodically varying field to be dynamically magnetized to change a magnitude of alternating current flowing through the series resonant circuit in accordance with either a depth or thickness of a hardened surface layer formed on the article, or the quality of the hardened steel article. The alternating current thus changed is extracted or taken out as a voltage by output means such as a resistor of low value series connected in the series resonant circuit, and provides a measure of either the thickness of the hardened surface layer on or the quality of the hardened ferromagnetic steel article.

The invention will be more readily apparent from the following detailed description taken in conjunction with the accompanying drawings in which:

FIG. 1 shows one portion of a B-H curve useful for explaining the operation of the invention;

FIG. 2 is a view similar to FIG. 1 and illustrating the principle of the invention;

Figure 3:
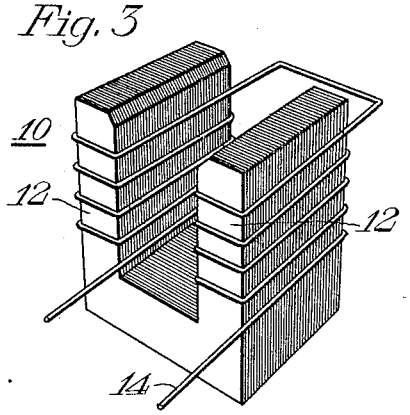
FIG. 3 is a schematic perspective view of a magnetizing device constructed in accordance to the teachings of the invention.

Before the invention is described as to its organization and manner of operation the principle thereof will now be described in conjunction with FIGS. 1 and 2 of the drawings.

It is well known that, when a body of magnetic material which has never been magnetized, i.e., is in the virgin state, is magnetized by an exciting winding which has flowing therethrough a flow of direct current having a slowly increasing magnitude, there is produced therein the magnetic induction B represented in FIG. 1 by a magnetization curve "oabc" which represents the magnetic induction B plotted against the magnetizing force or strength of magnetic field H caused by the flow of direct current with the field intensity H slowly increased from zero until the magnetic induction B reaches the magnetic saturation at a point c. As the field intensity H is then slowly decreased the magnetic induction B will be decreased along another magnetization curve "cd" as shown in FIG. 1. The magnetization curve "oabc" is usually referred to as the initial magnetization curve. As indicated in FIG. 1, the initial magnetization curve comprises a reversible magnetization region "oa" near the origin, a rotational magnetization region "bc" near the saturated state and an irreversible magnetization region "ab" therebetween.

It has been found that, with bodies of magnetic material having formed thereon hardened surface layers having different depths or thicknesses, and increase in depth or thickness of the same causes a decrease in permeability and residual magnetization but an increase in coercive force, hysteresis loss etc. As an example, FIG. 2 shows the first and second quadrants of B-H hysteresis loops for toroidal members of 0.4% chromium steel material having the same configuration and hardened surface layers formed thereon by high frequency hardening technique after heat treatment and having a depth or thickness of 0, 1.5 and 3.0 mm. respectively. The aforesaid B-H hysteresis loops have been depicted by using an arrangement shown in FIG. 6 with annular specimens each including an exciting primary winding and a secondary winding for detecting a magnetic flux as will be described hereinafter.

It is now assumed that, in order to dynamically magnetize, a body of ferromagnetic material, it is disposed within a periodically varying magnetic field having the maximum amplitude of $H_m$ (see FIG. 2) and superposed on a biasing magnetic field whose intensity is $H_{DC}$ (see FIGS. 1 and 2) in such a manner that the periodically varying field may extend or be effectively operated over substantially the entire range of an irreversible magnetization region of the initial magnetization curve for the ferromagnetic body such as above described in conjunction with FIG. 1. In this case, the periodically varying or alternating magnetic field is of relatively high amplitude as shown in FIG. 2. This alternating field H may be represented by the expression $$H = H_m e^{j\omega t}$$

where H and $H_m$ are the instantaneous and maximum amplitudes of the field respectively, $e$ the base of natural logarithm, $\omega$ an angular velocity of the field and $t$ is a time measured from an arbitrary reference time. Because of the hysteresis loss and eddy-current loss produced in the ferromagnetic body disposed in the abovementioned field, any change in the magnetic induction or the density of magnetic flux B of the same is disturbed so that its permeability is not only reduced but also the change in the magnetic induction B does not follow any change in magnetic field intensity H resulting in the occurrence of phase retardation. It is understood that an area enclosed by a minor hysteresis loop indicated by the dotted line in FIG. 2 is a measure of the hysteresis loss of the ferromagnetic materal per cycle of the alternating magnetic field. As shown in FIG. 2, the hysteresis loss is increased with an increased depth or thickness of a hardened surface layer formed on the body. Thus the alternating magnetic induction B produced in the body may be represented by the expression.

$$B = B_m e^{j(\omega t - \theta)}$$

wherein $B_m$ is the maximum amplitude of the magnetic induction due to the alternating field and $\theta$ is an angle by which the magnetic induction B lags behind the magnetic intensity H. Therefore, the permeability $\mu$ of the ferromagnetic material is represented by the expression $$\mu = \frac{B}{H} = \frac{B_m e^{j(\omega t - \theta)}}{H_m e^{j\omega t}} = \frac{B_m}{H_m} e^{-j\theta}$$

$$= \frac{B_m}{H_m}(\cos \theta + j \sin \theta)$$

$$= \mu' - j\mu'' \tag{1}$$

where $$\mu' = \frac{B_m}{H_m} \cos \theta \tag{2}$$

and $$\mu'' = \frac{B_m}{H_m} \sin \theta \tag{3}$$

In other words, such ferromagnetic material has a complex permeability $\mu$ comprising its real and imaginary components represented by the above Expressions 2 and 3 respectively.

The real component $\mu'$ of the complex permeability is that component of the magnetic induction B in phase with the field intensity H and hence is a permeability in a broad sense. If no loss is present then naturally $\mu = \mu'$. On the other hand, if an alternating magnetic field of relatively large amplitude extends throughout the irreversible magnetization range region of the initial magnetization curve where hysterisis loss is apt to be caused in a ferromagnetic body disposed in such field then that component of the magnetic induction B lagging behind the field intensity H by 90 electrical degrees will become large resulting in a sudden increase in the imaginary component $\mu''$ of the complex permeability. If ferromagnetic steel articles having formed thereon hardened surface layers having different depths or thicknesses are dynamically magnetized in an alternating magnetic field as shown in FIG. 2 then an increase in the depth or thickness of the layer causes a decrease of the real component $\mu'$ of the complex permeability and an increase of the imaginary component $\mu''$ thereof resulting from the loss of dynamic magnetization. Therefore, it will be appreciated that the complex permeability $\mu$ represented by the Expression 1 is greatly changed in character (or the values of $\mu'$ and $\mu''/\mu'$) with a depth or thickness of the hardened surface layer present as compared to an article with no such layer. The invention utilizes this phenomena to determine a depth or thickness of a hardened surface layer formed on a ferromagnetic steel article or the quality of the hardened article as a function of the complex permeability of the same.

According to the invention a magnetizing device for dynamically magnetizing a ferromagnetic steel article to be tested comprises a low-loss reactor including a substantially U-shaped magnetic core. The article may be disposed on a pair of leg portions of the core or between the same to form a magnetic circuit with the core. The magnetic circuit thus formed has, of course, its magnetization characteristics essentially dependent upon the magnetic properties of the steel article. Therefore, the complex permeability of the article is greatly affected by a depth or thickness of a hardened surface layer formed thereon and will greatly change a reactance component of an impedance provided by the reactor and its characteristics such as a figure of merit Q because the reactor is made such that it has its loss as low as possible as will be described hereinafter. In order to determine this change, the low-loss reactor includes an exciting winding connected across both a suitable source of direct current maintained substantially at a fixed voltage and a suitable source of alternating current maintained substantially at a fixed voltage, and is also connected to a resonant capacitor of a low-loss type to form a series resonant circuit adapted to be tuned at a frequency of an alternating current to be supplied from the source of alternating current to the exciting winding.

If both alternating current and a direct current flow from the respective source through the exciting winding there will be produced an alternating magnetic field superposed on a direct-current or biasing magnetic field as previously described in conjunction with FIG. 2 between the pair of leg portions of the reactor. With a ferromagnetic steel article to be tested being disposed within the combined field which corresponds to the irreversible magnetization region of the initial magnetization curve for the same, the reactance and Q of the abovementioned resonant circuit will be changed as previously described resulting in a large change in the flow of alternating current through the same. It is noted that, due to a relatively large variation in Q a resonant current flowing through the resonant circuit is largely changed. It will be seen that the difference between the current flow when the specimen has no hardened layer and this current is a measure of the depth or thickness of hardened layer of the article to be tested.

The principle of the invention thus far described can be practiced in the following manner. It is assumed that a depth or thickness of a hardened surface layer formed on a ferromagnetic steel article is to be determined.

(1) A low-loss reactor including a substantially U-shaped magnetic core and an exciting winding as briefly described hereinbefore and as will be in detail described in detail hereinafter is first provided for cooperating with a surface-hardened steel article to form a magnetic circuit to thereby dynamically magnetize the article when energized. The exciting winding is connected to a suitable capacitor to form a series resonant circuit adapted to be tuned at a frequency of an alternating current which energizes the reactor.

(2) The succeeding procedure is to determine magnitudes of a direct current and an alternating current flowing through the exciting winding of the reactor, the alternating magnetic field resulting from the alternating current for dynamically magnetizing the steel article being effectively operated substantially throughout an irreversible magnetization region of the initial magnetization curve for the article. To this end an unhardened article having the same configuration and type as the article to be measured can be disposed on the low-loss reactor to form a magnetic circuit and then a flow of direct current from a suitable source thereof through the exciting winding can be slowly changed to progressively magnetize the article toward its saturated state whereby the initial magnetization curve thereof is plotted against the slowly increasing strength of magnetic field. It will be seen that from the initial magnetization curve thus obtained the required magnitudes of direct and alternating currents can readily be determined such that an alternating magnetic field can be effectively operated substantially throughout an irreversible magnetization region of the curve.

(3) Thereafter a surface hardened steel article to be measured is similarly disposed on the low-loss reactor to form a magnetic circuit and is dynamically magnetized by a flow of direct and alternating currents through the exciting winding of the reactor at the respective magnitudes predetermined as above described. As is clear from the foregoing description of the principle of the inventon, the alternating current flowing through the resonant circuit will be greatly changed in magnitude dependent upon the depth or thickness of a hardened surface layer formed on the article with sources of direct and alternating currents maintained substantially at the fixed values of voltage respectively.

(4) Then the varying alternating current thus obtained is suitably amplified and passed to an indicator such as an alternating current ammeter or voltmeter which, in turn, indicates a measure of the depth or thickness of the hardened surface layer on the steel article.

To provide an alternating magnetic field superposed on a biasing magnetic field where a steel article to be measured is disposed to be dynamically magnetized, a low-loss reactor such as that shown in FIG. 3 can be used. A low-loss reactor generally designated by the reference numeral 10 includes a substantially U-shaped magnetic core 12 and an exciting winding 14 inductively disposed on a pair of leg portions of the core. Preferably, the core is formed of stacked laminations of any suitable magnetic material such as a high permeability silicon steel or permalloy to thereby minimize its core loss and reluctance and the exciting winding is of the split-winding type and formed of turns of a highly conducting wire, such as copper, having a relatively large diameter to thereby minimize its copper loss. This permits a figure of merit Q for the reactor to be high. It is noted that the stacked laminations should have a thickness such that the core will be driven at a saturation level somewhat lower than its level of maximum saturation even when a steel article to be measured, which is disposed on the core, is sufficiently magnetized.

Preferably, the low-loss reactor has its inductance sufficiently high as compared to that of a source of alternating current for exciting the reactor and has a figure of merit Q of above 35 over the range of commercial power frequency used. If desired, an air-core cylindrical solenoid may replace the low-loss reactor provided that the inductance of the solenoid can be made sufficiently higher than that of said source. For example, assuming that an article to be determined is large in size and may be inserted in an air-core cylindrical solenoid of large size, the latter can have the number of turns therein increased to have its increased inductance sufficient to substitute for the low-loss reactor. Such an air-core cylindrical solenoid may be conveniently used in measuring the hardness of a large-sized steel article complicated in configuration. In a preferred embodiment of the reactor, the yoke portion had its length of 140 mm., and the leg portion was 190 mm. high and 90 mm. wide with the maximum spacing between the opposed inside faces being 86 mm. The exciting winding was formed of approximately 1000 turns of a copper wire having a diameter of 1.5 mm. It is to be noted that these figures may be considerably varied in accordance with the dimension of an article to be measured.

Figure 4:
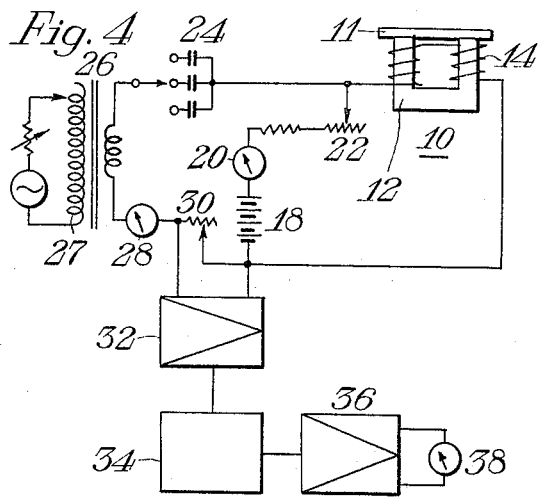
FIG. 4 is a diagrammatic view of the device of FIG. 3 in operation and an electrical circuit suitable for use with the same.

Referring now to FIG. 4 the exciting winding 14 of the low-loss reactor 10 is connected across a suitable source of direct current shown as a battery 18 through a direct current ammeter 20 and a variable resistor 22 whereby the winding is adapted to be differently energized with different magnitudes of direct current under the control of the variable resistor. It will be understood that the magnitude of direct current may be controlled by changing the voltage of the source 18. It is to be noted that, in order to prevent decrease in Q of the low-loss reactor, the source 18 should be connected across the reactor through a high resistance. In general, the source of direct current may preferably have its output voltage exceeding 100 volts. The exciting winding 14 also is adapted to be energized by an alternating current circuit extending from one end of the winding through a capacitor 24, a secondary winding of a transformer 26, an alternating current meter 28 and a variable resistor 30 back to the other end of the winding 14.

Thus the secondary winding of the exciting transformer 16, the resonating capacitor 24, a low-loss reactor 10, the resistor 30 forms a series resonant circuit. This resonant circuit is designed and constructed such that the same should have a high Q and a low resistive component to thereby have a sharp resonance curve symmetrical with respect to its tuning point, whereby a flow of alternating current through the series resonant circuit will be greatly changed for a given variation in inductance of the low-loss reactor. Since the secondary winding of the transformer 26 provides a supply to the resonant circuit, the winding is formed of thick enamelled wire wound in split manner for the purpose of minimizing the impedance of the winding. In this connection, the impedance of the secondary winding itself is required to be less than at least a tenth the impedance of the low-loss reactor over the range of commercial power frequency used.

It is to be noted that the capacitor 24 should have a capacitance which is combined with the inductance of the exciting winding 14 to cause the aforesaid series resonant circuit to tune at a frequency of exciting current when the reactor has its magnetic circuit open or when the reactor is operatively associated with a steel article having its permeability maximum among those to be measured. This permits an operator to select either one or the other slope portion of the resonance curve which represents a change in the flow of exciting alternating current through the resonant circuit due to a variation in inductance of the reactor. More specifically, if the capacitance of the capacitor is set to utilize that slope portion of the resonance curve associated with the higher permeability, an increase in permeability of a steel article to be measured causes increase in inductance of the reactor forming a closed circuit together with the article, whereby the magnitude of the exciting alternating current is moved away from that at the tuning point resulting in decrease in the exciting current. On the contrary, if the capacitor is set to utilize the other slope portion on the resonance curve an increase in permeability of the article causes the magnitude of the exciting current to approach that at the tuning point thereby increasing the current. Therefore, any suitable one of several capacitors disposed in parallel may be selectively connected to the exciting winding by any suitable switch as shown in FIG. 4. As previously pointed out, any change in the flow of alternating current through the resonant circuit 14–24 is measured so that the transformer 26 should have its primary winding 27 adapted to be energized with an alternating current at a substantially fixed voltage and have a plurality of taps for controlling the alternating current flowing through the resonant circuit.

The output of the resistor 30 is coupled to any suitable amplifier 32 which, in turn, is connected to a clipper circuit 34. The output of the clipper circuit 34 is connected through an amplifier 36 to an output voltmeter 38. The amplifiers 32 and 36 and the clipper circuits 34 may be of the electronic type and are well known to those skilled in the art. It is therefore believed that they need not be described in detail.

Figure 6:
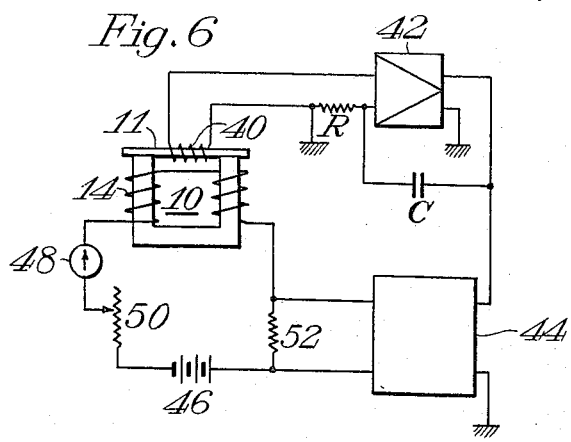
FIG. 6 is a schematic diagram illustrating a method of obtaining the initial magnetization curve for a ferromagnetic steel article.

In practicing the present invention the strengths of biasing and alternating magnetic fields with which an article to be measured is to be dynamically excited are first required to be determined. As previously described, the strengths of such magnetic fields can be conveniently determined from the initial magnetization curve for the article. While the initial magnetization curve may be obtained in any of the various manners previously known to those skilled in the art, the same may be preferably determined by disposing on the pair of leg portions of the low-loss reactor 10 shown in FIG. 3 an article identical in configuration and type with the article to be measured but including no hardened surface layer to complete a magnetic circuit as shown in FIG. 6. Then any suitable pickup winding 40 is inductively disposed on the article 11 and connected to a conventional X-Y recorder 44 through an amplifier 42 including a negative feedback connection R–C. The exciting winding 14 of the reactor 10 is connected across any suitable source of direct current 46 through a direct current ammeter 48, a variable resistor 50 and a fixed resistor 52, the latter resistor 52 being connected to the X-Y recorder 44.

With the arrangement just described, the variable resistor 50 can be slowly controlled to increase the flow of direct current through the exciting winding 14 from its null magnitude whereby a B-H curve or the initial magnetization curve is obtained on the X-Y recorder 44. It will be seen that from the curve thus obtained the magnitudes of a direct current and an alternating current can be determined respectively such that they will produce the resultant biasing and alternating magnetic field having the desired magnitude substantially reaching the limits of the irreversible magnetization region of the initial magnetization curve. Since an indication on the X axis of the X-Y recorder 44 is expressed in terms of ampere turns, the magnitudes of exciting direct and alternating currents are readily determined for the required strengths of A.C. and D.C. magnetic fields. The ratio of direct current to alternating current magnitude may be considerably varied dependent upon the core loss of the low-loss reactor. However, it has been found that the optimum ratio of the magnitude of direct current to the amplitude of alternating current appears to be approximately 1 to 2. Because of relatively high loss produced in the reactor core by the flow of alternating current through the exciting winding the alternating current must be relatively high with respect to the direct current.

As above described, the magnitudes of exciting D.C. and A.C. fields can be determined upon the basis of the initial magnetization curve for an article having a hardened surface layer of null thickness. However, in order to reliably obtain such magnitudes the following process may be used. First the arrangement shown in FIG. 6 is used to depict initial magnetization curves for a few articles having the same type and configuration but having different thickness of hardened surface layers (for example, 1.5 and 3.0 in thickness of the hardened layer). The curve thus depicted represents variation in the magnetization or B-H curves due to change in thickness of hardened surface layers. Thus by taking into account those B-H curves the magnitudes of both exciting fields may be determined to have the respective strengths sufficient to excite articles to be tested throughout the irreversible magnetization range of the B-H curve corresponding to the thickness of the hardened surface layer formed on the same (see FIG. 2). Alternatively annular specimens for determining magnetic characteristics may be cut from steel articles to be measured. When the B-H curves for the specimens are expressed in terms of B per cm.$^2$ and H per cm., the magnitudes of both exciting fields can be easily calculated after the articles have been measured in both cross sectional area and length. It has been found that by preparing annular specimens from a number of steel articles having different thicknesses of hardened surface layer or different quality of hardness, depicting B-H curves in B per cm.$^2$ and H per cm. for those specimens and statistically arranging the data obtained, the optimum magnitudes of exciting D.C. and A.C. fields are substantially distributed between 20 and 30 oersteds for the D.C. field and between ± 10 and ±5 oersteds for the A.C. field, per centimeter of the specimens. This may be very conveniently utilized to establish the exciting D.C. and A.C. magnetic fields.

Then reactor 10 with the unhardened article is connected in the circuitry shown in FIG. 4. Both a direct current and an alternating current at the respective magnitudes predetermined as above described are caused to flow from the sources 18 and 26 through the exciting winding 14. To this end, the variable resistor 22 and/or the source of direct current 18 can be controlled until the desired magnitude of direct current is obtained as observed on the ammeter 20. The desired magnitude of alternating current can be obtained by effecting a change of the tap connection on the primary winding 27 of the transformer 26 and/or controlling of an alternating voltage applied to the same as observed on the ammeter 28. It is noted that the variable resistor 30 ranges from 1 to 2 ohms and does not serve to control the alternating current. To prevent decrease in Q of the series resonant circuit, the resistor 30 may preferably have its resistance not exceeding 1 ohm.

Then the gain of the amplifier 32 is controlled such that the output from the resistor 30 causes the output from the voltmeter 38 to give a null indication.

Thus the circuit arrangement shown in FIG. 4 is ready for measurement.

With the currents from the sources 18 and 26 maintained at the predetermined magnitudes the unhardened article is replaced by a hardened article to be measured. As previously described in conjunction with FIG. 2, the complex permeability of the hardened article disposed on the reactor 10 is changed in accordance with the depth or thickness of a hardened surface layer formed on the article as compared with the permeability of an unhardened article and this change is reflected in the reactance and Q of the series resonant circuit consisting of the exciting winding 14 and the capacitor 24. Therefore, a flow of alternating current through the resonant circuit 14–24 is greatly changed or decreased because the source of direct current 18 and the transformer 26 are maintained at fixed voltages as above described. This changed alternating current is taken out from the resistor 30. The output from the resistor 30 is then passed through the amplifier 32, the clipper circuit 34 and the amplifier 36 to the output voltmeter 38 which gives a measure of said depth. Since the voltmeter has been initially adjusted to give a null indication when an unhardened article was disposed on the reactor 10, the changed alternating current will appear as an increment of the mill indication on the meter. As will be illustrated later the indication on the output meter varies as an approximately linear function of the depth or thickness of the hardened surface layer.

As previously described, an increase in depth or thickness of the hardened layer causes a decrease in the permeability. Therefore when there are three ferromagnetic articles hardened to thicknesses of 0, 1.5 and 3.0 mm. respectively the unhardened article has the highest permeability and the article having the hardened thickness of 3.0 mm. has the lowest permeability. Under these circumstances assuming that that the resonating capacitor 24 has been set to utilize that slope portion of the resonant curve for the resonant circuit associated with the lower permeability the exciting alternating current flowing through the same circuit is decreased in the order of 0, 1.5 and 3.0 mm. for the hardened thickness. Therefore a region over which the article is dynamically excited by the A.C. field as shown in FIG. 2 increases as the hardened thickness increases. As a result, an increase in the hardened thickness tends to increase further a change in the alternating current flowing through the series resonant circuit.

Also it will be appreciated that the voltmeter 38 may be calibrated in terms of the hardened thickness such that its indication of the hardened thickness of 0 mm. corresponds to a graduated line 0 of the scale, while its indication of the hardened thickness of 3.0 mm. for example corresponds to the maximum graduated line, in order to provide a direct reading type of indicator.

From the foregoing it will be appreciated that, because of a large change in the flow of alternating current through the resonant circuit 14, 24 resulting from a surface hardened article, the depth or thickness of a hardened surface layer formed on the same can be readily read on the output meter 38 with a high degree of accuracy.

Since an article to be measured is disposed on a low-loss reactor excited within an alternating magnetic field the distribution of magnetic flux flowing through the article tends to be locally concentrated. This leads to an advantage of the invention that any irregularity in the hardened state of a hardened ferromagnetic article can readily be detected by changing that portion of the same contacting the reactor. This distribution is greatly affected by the manner in which the article is placed on the reactor or whether the article contacts the reactor in line contact or surface contact and simultaneously by a skin effect due to the frequency of an alternating magnetic field used. Therefore, for a wide range in which depth or thickness of hardened surface layers may be distributed, as in the case of high frequency hardened articles, a frequency on the order of the frequency of commercial electric power or a frequency of from 50 to 60 cycles per second can be satisfactoriy used to produce an alternating magnetic field. However, in the case where the depths or thickness of the hardened surface layers are distributed in a narrow range in which a depth or thickness of approximately 0.1 mm. is critical, as in cementation hardened layers, an alternating magnetic field may be preferably chosen to have a high frequency above which substantially no hysteresis loss will take place. At such frequency the depth or thickness of the hardened layer can be effectively determined with a high degree of accuracy.

On the other hand, if it is desired to determine only the quality of a hardened ferromagnetic steel article then the distribution of magnetic flux flowing through the same need not be locally concentrated. In such case, a low-loss reactor may be preferably used in the form as shown in FIG. 5a or FIG. 5b dependent upon the configuration of the article to be tested.

Figure 5A:
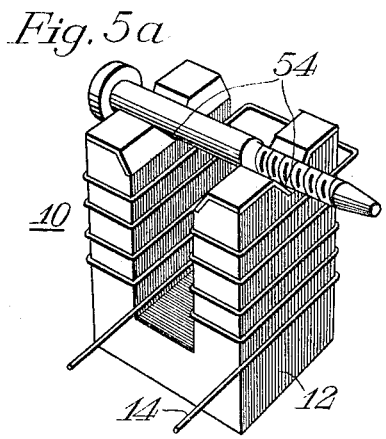
FIGS. 5a and 5b show schematically perspective views of modified magnetizing devices constructed in accordance with the teachings of the invention and illustrating also specimens disposed in tested position.

In FIG. 5a wherein like reference numerals are used to identify the corresponding components shown in FIG. 3 there is illustrated a low-loss reactor 10 including a pair of aligned recesses 54 formed on the free end faces of a pair of leg portions of a core 12. An article, such as a bolt to be tested 56, can be put in the recesses 54.

Figure 5B:
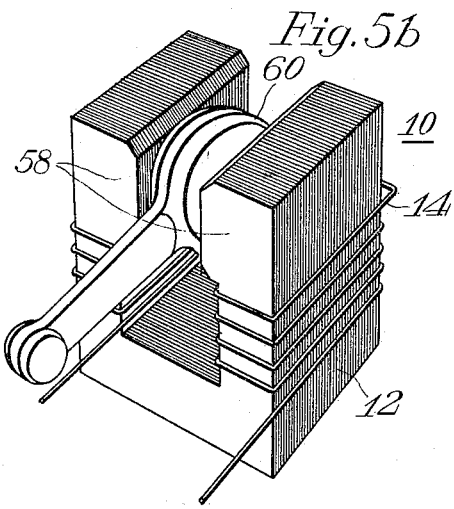

FIG. 5b wherein like reference numerals are used to identify the corresponding components shown in FIG. 3 illustrate a low-loss reactor 10 including a pair of leg portions 12 having a pair of inwardly extending portions 58 in opposed relationship. An article, such as a pitman arm 60, to be tested is supported between the pair of inwardly extending portions 58 by any suitable supporting means (no shown).

Referring now to FIGS. 7a–7f of the drawings, there are illustrated certain examples in which various mechanical elements of ferromagnetic steels having different configurations and different types were tested according to the system of the invention thus far described. As seen in FIGS. 7a–7f, measured values represented by the symbol "dot" are distributed in a relatively narrow band defined by a pair of spaced parallel lines each inclined at an angle to the axis of the abscissa. The reference character "h" designates a surface hardened portion of each mechanical element shown in the associated FIGS. 7a–7d with its dimension denoted in inches.

Figure 7A:
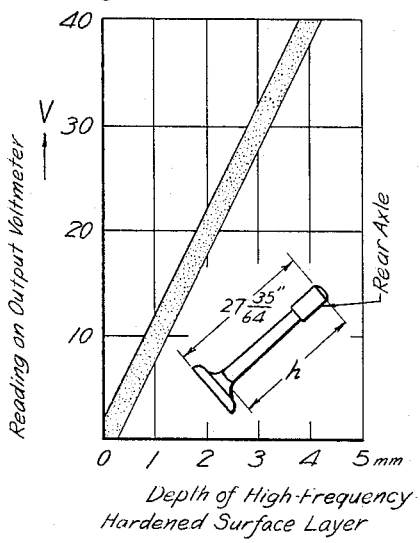
FIGS. 7a–7f are graphs illustrating the results obtained when various mechanical elements for use in automobiles were tested according to the teachings of the invention, together with the elements tested.

In FIG. 7a a rear axle for use in an automobile was made of 0.45% carbon steel, heat treated and surface hardened by a high frequency hardening technique. The black axles differently surface hardened in this way were disposed, one at a time, on a low-loss reactor such as that shown by 10 in FIG. 4 and measured by the circuitry shown in the same figure with the exciting winding of the reactor energized with both a direct current whose magnitude was 200 ma. and an alternating current whose amplitude was 300 ma. at a frequency of commercial electric power.

Figure 7B:
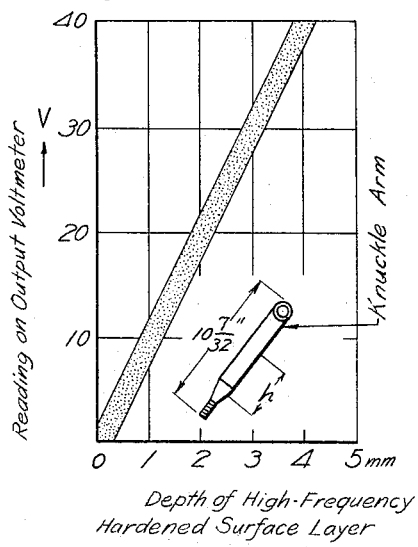

A knuckle arm shown in FIG. 7b was made of 0.4% carbon containing chromium-molybdenum steel and treated and measured in the same manner as above described, except that a direct current of 250 ma. and an alternating current having an amplitude of 400 ma. were used. Thus the result shown in FIG. 7b was obtained.

Figure 7C:
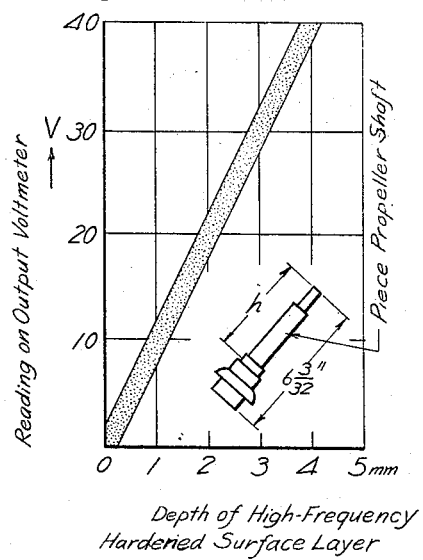

FIG. 7c shows the case of propeller shafts for use in an automobile which were made of 0.4% carbon-chromium steel and similarly treated and measured. However, the measured shafts were free from black coating or scale and dynamically magnetized with both a direct current of 300 ma. and an alternating current having an amplitude of 500 ma.

Figure 7D:
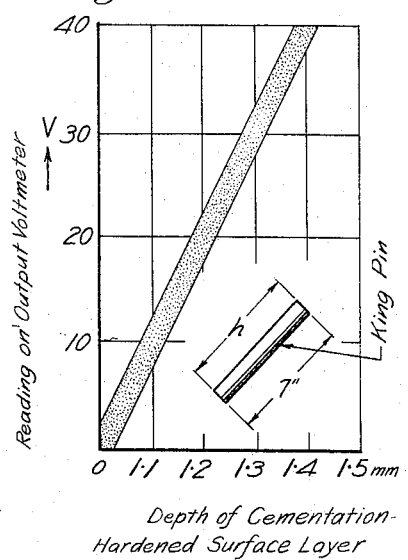

FIG. 7d shows a relationship between a reading on the output meter 38 (FIG. 4) and the depth or thickness of a hardened surface layer of a pin which was made of 0.4% carbon-chromium steel and surface hardened by a cementation hardening technique with an exciting winding of a U-shaped core reactor energized with both a direct current of the order of 120 ma. and an alternating current of about 300 ma. (peak value) at a frequency of 100 cycles per second.

Figure 7E:
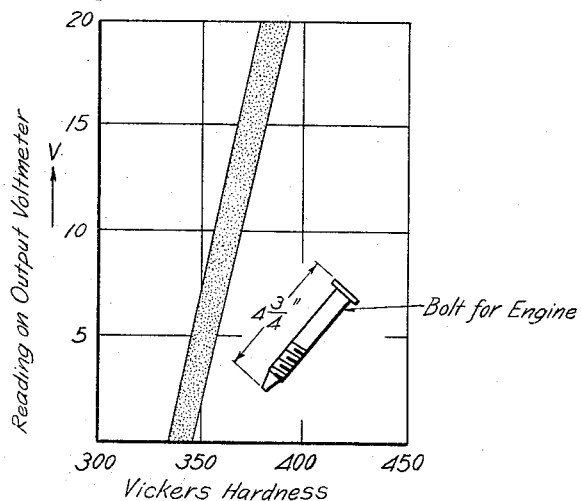
Figure 7F:
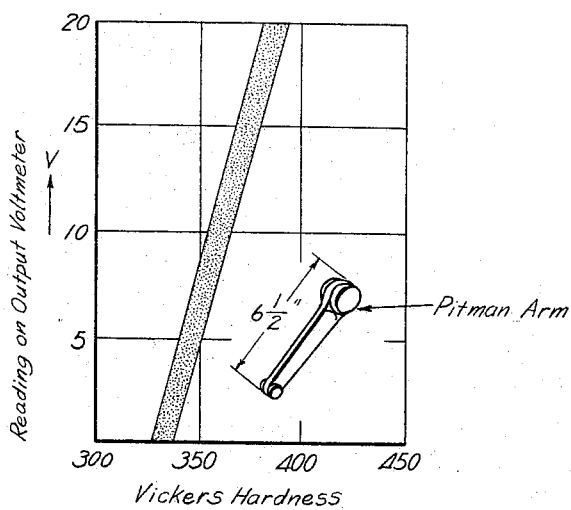

FIGS. 7a through d illlustrate the results of quantitative measurement whereas FIGS. 7e and 7f illustrate the results of qualitative measurement.

FIG. 7e shows a relationship between a reading on the output meter 38 (FIG. 4) and the hardness of a forged bolt shown in the same figure. The bolts were made of 0.4% carbon-chromium steel, and subjected to quenching and annealing treatments. In this measurement a low-loss reactor such as that shown in FIG. 5a was used and its exciting winding was energized with both a direct current of the order of 120 ma. and an alternating current of approximately 250 ma. (peak value) at a frequency of commercial electric power, these values being for an unhardened pin having a Vickers hardness of 330.

FIG. 7f shows a graph similar to FIG. 7e but illustrating the case where forged pitman arms made of 0.4% carbon-chromium steel were disposed, one at a time on a low-loss reactor such as that shown FIG. 5b with its exciting winding energized with both a direct current of the order of 120 ma. and an alternating current of about 250 ma. (peak value), these values being for an unhardened arm having a Vickers hardness of 320.

From FIGS. 7a–7f it will be seen that the invention can determine depths or thicknesses of hardened surface layers formed on various steel articles by high frequency or cementation hardening techniques and/or the quality of the hardened steel articles based on their hardnesses, in a stable manner with a high degree of accuracy.

From the foregoing it will be appreciated that the objects of the invention have been accomplished by providing a system of testing hardened steel articles without destroying them, comprising means for dynamically magnetizing the same substantially throughout an irreversible magnetization region of the initial magnetization curve for unhardened steel articles identical in configuration and type with the articles to be tested.

It will be readily understood by those skilled in the art that, since the hardness of a steel article depends upon its heat-treated state, composition and the like, the invention can be equally applied to determination of the same.

While the invention has been described in conjunction with certain embodiments thereof it is to be understood that various changes, modifications and substitutions may be made without departing from the spirit and scope of the invention. It will be appreciated that, instead of a low-loss reactor including a substantially U-shaped core, a high Q, air core reactor of cylindrical shape can be effectively used to determine the quality, such as hardness, of a hardened ferromagnetic steel article. In this case, the reactor preferably has a Q exceeding 100 and an article to be tested may be conveniently disposed within the interior of the cylindrical air-core reactor.

What I claim is:

1. A method of testing hardened ferromagnetic steel articles without destroying them, comprising the steps of determining the initial magnetization curve for an unhardened ferromagnetic steel article corresponding in configuration and type to the hardened ferromagnetic steel article to be tested, obtaining from said initial magnetization curve strengths of A.C. and D.C. exciting fields sufficient to excite the article to be tested throughout a predetermined part of the irreversible magnetization portion of the said magnetization curve corresponding to a parameter selected from the group consisting of the thickness of the hardened surface layer and the hardness of hardened steel article, providing both a source of A.C. voltage having a fixed frequency and a source of D.C. voltage and adjusting said sources to operate on said irreversible magnetization portion of said magnetization curve with the unhardened article within the magnetic field of a reactor means energized by both sources, providing a series resonant circuit comprising said reactor means, capacitor means and resistor means and tuning said circuit at the frequency of said source of A.C. voltage, adjusting the output of an indicating circuit connected to said series resonant circuit to a null point when said reactor means has the unhardened article disposed within the field thereof and said series resonant circuit is energized by both sources, replacing the unhardened article with the article to be tested, and observing the output of said indicating circuit as a measure of said parameter.

2. A method of testing hardened ferromagnetic steel articles as claimed in claim 1, wherein providing said source of alternating current comprises providing such a source which has an impedance less than one tenth the impedance of said reactor.

3. A method of testing hardened ferromagnetic steel articles as claimed in claim 1, wherein providing said series resonant circuit comprises providing a capacitor having a capacity which makes said series resonant circuit resonant at the frequency of said source of alternating current when the magnetic circuit of said reactor is opened.

4. A method of testing hardened ferromagnetic steel articles as claimed in claim 1, wherein providing said series resonant circuit comprises providing a capacitor having a capacity which makes said series resonant circuit resonant at the frequency of said source of alternating current when a ferromagnetic steel article having the highest permeability among articles to be measured engages the reactor.

5. A method of testing hardened ferromagnetic steel articles as claimed in claim 1, wherein providing said series resonant circuit comprises providing such a circuit having symmetric resonance characteristics and a Q of at least 35.

6. A method of testing hardened ferromagnetic steel articles without destroying them, comprising the steps of determining the initial magnetization curves for specimens from the articles to be tested selected so as to have a minimum, an intermediate and a maximum thickness of the hardened surface layer formed on the article, obtaining from said initial magnetization curves strengths of A.C. and D.C. fields sufficient to excite the article to be tested throughout a predetermined part of the irreversible magnetization portion of the magnetization curve, said predetermined part corresponding to a parameter selected from the group consisting of the thickness of the hardened surface layer and the hardness of the hardened steel articles, providing both a source of A.C. voltage having a fixed frequency and a source of D.C. voltage and adjusting said sources to operate on said irreversible magnetization portion of said magnetization curve for the same specimen within a magnetic field of a reactor energized by both sources, providing a series resonant circuit comprising said reactor means, capacitor means and resistor means and tuning said circuit at the frequency of said source of A.C. voltage, adjusting the output of an indicating circuit connected to said series resonant circuit to a null magnitude when said reactor means has the specimen having the minimum thickness hardened surface layer disposed within the field of the same and said series resonant circuit is energized by both sources, replacing the specimen with the article to be tested, and observing the output of said indicating circuit as a measure of said parameter.

References Cited by the Examiner

UNITED STATES PATENTS

| | | | |
|---|---|---|---|
| 2,329,812 | 9/1943 | Zuschlag | 324—34 |
| 2,331,418 | 10/1943 | Nolde | 324—34 |
| 2,587,631 | 3/1952 | Kuehne | 324—34 |

FOREIGN PATENTS 299,388   7/1928   Great Britain

OTHER REFERENCES

Thomson, W. T., Resonant Nonlinear Control Circuits, Electrical Engineering, August 1938, vol. 57, p. 469–476.

WALTER L. CARLSON, *Primary Examiner.*

F. A. SEEMAR, R. J. CORCORAN,
*Assistant Examiners.*